[12] United States Patent  
Buchko et al.

(10) Patent No.: US 7,434,380 B2  
(45) Date of Patent: *Oct. 14, 2008

(54) MAGNETIC ATTACHMENT OF A BED KNIFE IN A REEL MOWER ASSEMBLY

(75) Inventors: Jeff Buchko, Clover, SC (US); Glen Trentini, Lumsden (CA)

(73) Assignee: Textron Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/095,715

(22) Filed: Mar. 31, 2005

(65) Prior Publication Data

US 2005/0166567 A1  Aug. 4, 2005

Related U.S. Application Data

(63) Continuation of application No. 10/201,841, filed on Jul. 24, 2002, now Pat. No. 6,889,491.

(51) Int. Cl.  
*A01D 34/53* (2006.01)

(52) U.S. Cl. ........................................ 56/249

(58) Field of Classification Search .............. 56/16.7, 56/249, 294, 249.5, 250, DIG. 17, DIG. 20, 56/6, 7; 403/DIG. 1; 83/698.11, 698.21  
See application file for complete search history.

(56) References Cited

U.S. PATENT DOCUMENTS

| | | | | |
|---|---|---|---|---|
| 905,591 A | * | 12/1908 | Rowe | 56/294 |
| 1,044,735 A | * | 11/1912 | Bond | 56/294 |
| 1,348,471 A | * | 8/1920 | Aspinwall | 56/294 |
| 1,355,509 A | * | 10/1920 | Coldwell | 56/294 |
| 1,903,183 A | * | 3/1933 | Jessup | 56/294 |
| 2,045,386 A | * | 6/1936 | Gottschalk | 56/294 |
| 2,490,169 A | * | 12/1949 | Swahnberg | 56/249 |
| 2,528,625 A | | 11/1950 | Voytershark et al. | |
| 2,557,897 A | * | 6/1951 | Sullivan | 56/289 |
| 3,337,100 A | | 8/1967 | Berning | |
| 3,350,045 A | | 10/1967 | Mayers | |
| 3,782,166 A | | 1/1974 | Whistler, Jr. et al. | |
| 4,195,542 A | | 4/1980 | Zimmer | |
| 4,233,873 A | | 11/1980 | Jessen | |
| 4,637,204 A | * | 1/1987 | Benson et al. | 56/249 |
| 5,291,724 A | | 3/1994 | Cotton | |
| 5,293,734 A | * | 3/1994 | Mills | 56/249 |
| 5,379,671 A | | 1/1995 | Kang | |
| 5,477,666 A | | 12/1995 | Cotton | |
| 5,822,966 A | * | 10/1998 | Snell | 56/249 |
| 5,979,150 A | | 11/1999 | Klingler | |
| 6,044,637 A | | 4/2000 | Thier et al. | |
| 6,070,338 A | * | 6/2000 | Garity | 33/760 |
| 6,301,867 B1 | * | 10/2001 | Rickheim | 56/294 |
| 6,318,059 B1 | | 11/2001 | Cotton | |
| 2003/0000195 A1 | | 1/2003 | Watkins | |

FOREIGN PATENT DOCUMENTS

FR 2597933 10/1987

* cited by examiner

*Primary Examiner*—Árpád Fábián-Kovács  
(74) *Attorney, Agent, or Firm*—Harness Dickey & Pierce P.L.C.

(57) ABSTRACT

A reel mower assembly comprises a mower reel rotatably mounted to a frame, and a drive operative to rotate the reel about a reel axis. A plurality of magnets are mounted on the frame and a bed knife is magnetically held against the magnets in an operating position such that the bed knife is oriented in cutting relationship with the reel.

20 Claims, 3 Drawing Sheets

MAGNETIC ATTACHMENT OF A BED KNIFE IN A REEL MOWER ASSEMBLY

CROSS-REFERENCE TO RELATED APPLICATIONS

This application is a continuation of U.S. patent application Ser. No. 10/201,841 filed on Jul. 24, 2002. The disclosure of the above application is incorporated herein by reference.

FIELD OF THE INVENTION

The present invention relates to improved reel mower assemblies and reel mower units incorporating such assemblies. More specifically, it relates to an alternative attachment of the bed knife to the mower reel assembly which reduces maintenance costs.

BACKGROUND OF THE INVENTION

Reel mowers use a scissoring action to shear grass and like foliage, rather than tearing the leaves. Such reel mowers are more expensive and require more maintenance than rotary mowers, however they are preferred by golf courses and the like where appearance and healthy grass are important. Individual reel mower assemblies are quite narrow, and consequently reel mower units commonly comprise a plurality of side-by-side reel mower assemblies.

Examples of such mowers are disclosed in U.S. Pat. Nos. 5,291,724, 5,477,666, and 6,318,059. In a typical reel mower assembly, an attachment member, commonly called a bed bar, is attached to the apparatus in rigid relationship to the reel, and a replaceable bed knife is attached to the bed bar. The reel, bed bar and bed knife are oriented such that the bed knife is held parallel to the reel axis and in close proximity to the reel knives so that a shearing action is achieved between the reel knives and the bed knife. Typically an adjustment mechanism is provided to allow movement of the bed bar relative to the reel so that the bed knife can be moved into proper relationship with the rotating reel knives.

Conventionally, the bed knife is attached to the bed bar with a plurality of screws placed through holes in the bed knife and engaging threaded holes in the bed bar. Typically ten or more screws are used. Changing the bed knife requires that these screws be removed, and then replaced. Typically the bed knife is attached to the underside of the bed bar so that the apparatus must be raised sufficiently, or partially disassembled, to allow access to the underside of the reel mower assembly to remove the screws and the bed knife. A reel mower unit such as is used by a golf course or the like may comprise eight or ten individual reel mower assemblies, and changing bed knives on such a mower unit requires significant labor time and corresponding downtime.

As well, the screws fix the bed knife to the bed bar such that when a stone or similar debris enters the mower, it can jam between the fixed bed knife and the reel, causing damage to one or more portions of the apparatus. Similarly should the bed knife contact a substantially buried obstruction, the bed knife can be damaged as it bounces over the obstruction. While the bed knife can simply be replaced, damage to the reel is generally much more costly and problematic, given the close tolerances required for proper operation.

SUMMARY OF THE INVENTION

It is the object of the present invention to provide an improved reel mower assembly, and an improved bed knife that can be attached to existing reel mower assemblies, that allows for quick changing of the bed knife with significantly reduced labor and downtime compared to the prior art.

In a first aspect the invention provides a reel mower assembly comprising a mower reel rotatably mounted to a frame, and a drive operative to rotate the reel about a reel axis. At least one magnet is mounted on the frame and a bed knife is magnetically held against the magnet in an operating position such that the bed knife is oriented in cutting relationship with the reel. Engagement means are operative to prevent sliding movement of the bed knife with respect to the magnet while allowing the bed knife to move away from the magnet when a separating force is exerted on the bed knife in a direction away from the magnet that is greater than an attractive force exerted on the bed knife by the magnet when the bed knife is in the operating position.

In a second aspect the invention provides an apparatus adapted for attachment to a reel mower assembly comprising a mower reel rotatably mounted to a frame and a drive operative to rotate the reel about a reel axis. The apparatus comprises a bed bar adapted for attachment to the frame substantially parallel to the reel axis and a plurality of magnets mounted on the bed bar. A bed knife is magnetically held against the magnets in an operating position such that the bed knife is oriented in cutting relationship with the reel when the bed bar is attached to the frame. Engagement means are operative to prevent sliding movement of the bed knife with respect to the magnets while allowing the bed knife to move away from the magnets when a separating force is exerted on the bed knife in a direction away from the magnets that is greater than an attractive force exerted on the bed knife by the magnets when the bed knife is in the operating position.

The engagement means can comprise protrusions extending from one of the frame and bed knife into corresponding recesses in the other of the frame and bed knife. Alternatively ridges could be formed on the frame such that the ridges bear against the front edge and side edges of the bed knife. Such ridges would prevent rearward or sideways movement, leaving the front cutting edge open and in cutting relationship to the reel. Little forward directed force will ordinarily be encountered by the bed knife in such a reel mower assembly, and such forward force could be resisted by the magnets. The protrusions and recesses have the advantage of resisting sliding forces forward, rearward or sideways. Both ridges and protrusions allow a separating force to be exerted on the bed knife to overcome the magnetic force holding the bed knife to the magnets in order to remove the bed knife.

In a third aspect the invention provides, in a reel mower assembly comprising a mower reel rotatably mounted to a frame and a drive operative to rotate the reel about a reel axis, a method of holding a bed knife in an operating position such that the bed knife is oriented in cutting relationship with the reel. The method comprises mounting at least one magnet on the frame, magnetically holding the bed knife against the magnet in the operating position, and preventing sliding movement of the bed knife with respect to the magnet while allowing the bed knife to move away from the magnet when a separating force is exerted on the bed knife in a direction away from the magnet that is greater than an attractive force exerted on the bed knife by the magnet when the bed knife is in the operating position.

Commercial grade magnets are available of sufficient strength such that when they are built into the supporting frame for the bed knife, typically on a frame portion called the bed bar, they will hold the bed knife in the operating position resisting considerable separating forces that might be encountered by the bed knife in operation. The engagement means prevents sliding movement of the bed knife with respect to the bed bar in response to the rearward force of the reel pulling grass against the forward edge of the bed knife, or in response to sideways forces during turns. The engagement means aligns the bed knife in the proper operating position. When the bed knife and bed bar are clean, the bed knife can be readily maneuvered into engagement with the protrusions, ridges or the like and will then snap into place in response to the force of the magnets.

The magnetic attachment of the bed knife to the frame has numerous advantages over the mechanical or screw attachment of the prior art. The magnetic attachment results in a quick change assembly where the bed knife can basically be changed by prying it away from the magnets and attaching another bed knife to the magnets in its place without the need to disassemble the reel mower assembly from the remainder of the reel mower unit to access the screws holding the bed knife in place.

The present invention yields a relatively "tool-less" bed knife changing operation. The only tool required to remove a bed knife from the frame would be a blade or the like to pry the items apart. The strength of the magnets and number of magnets used in the frame to hold the bed knife in place could be adjusted or varied depending on the circumstances.

The magnetic attachment also reduces maintenance costs by allowing the bed knife to be pulled away from its magnetic attachment and released from the bed bar when an obstruction such as a rock or the like is encountered. Damage to the reel and bed knife is thereby reduced.

While permanent magnets will likely be most widely suited, electromagnets could also be used to hold the bed knife in place. Where electromagnets are used, it would be even easier to release the blade from the frame, since by deactivation of the electromagnets the blades could easily be removed therefrom.

In addition to manufacturing a completed new reel apparatus in accordance with the present invention, a retrofit bed bar and bed knife could also be designed in accordance with the present invention to be retrofitted onto various existing reel mower units.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
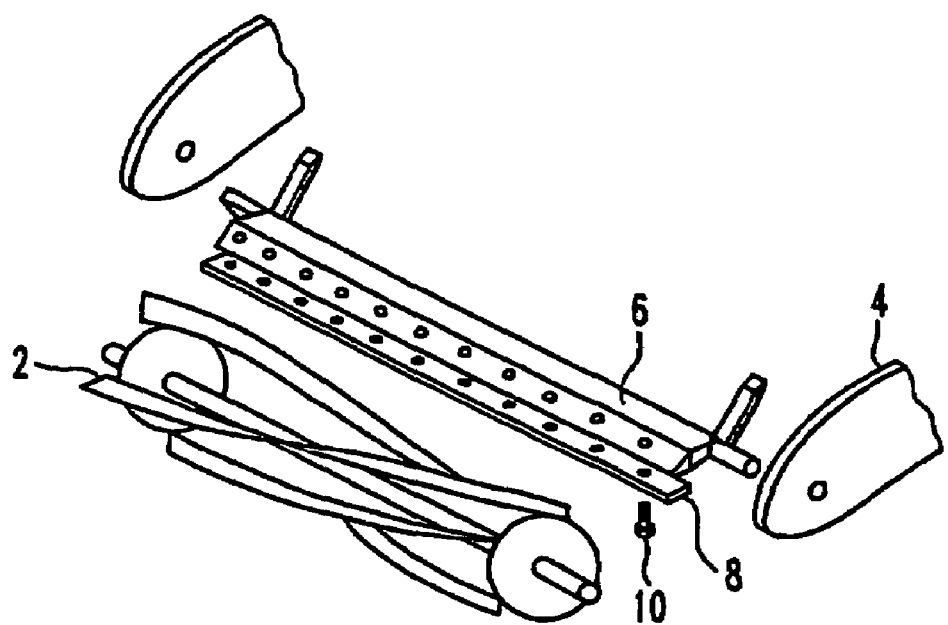
FIG. 1 is an exploded perspective view showing a reel mower assembly and typical bedknife mounting assembly of the prior art.
Figure 2:
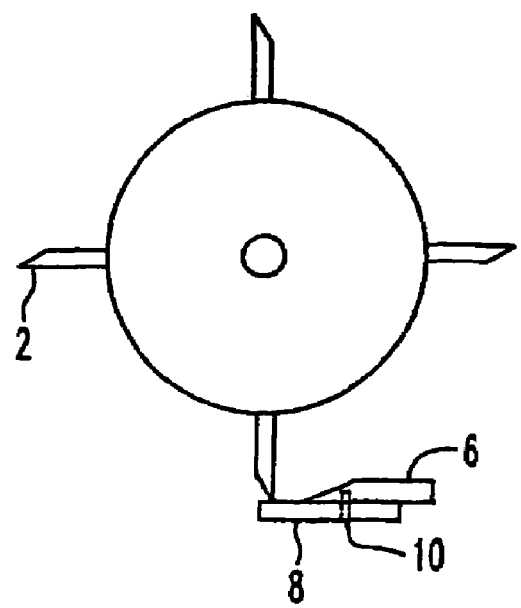
FIG. 2 is a schematic side view showing the reel and bedknife mounting arrangement of the prior art reel mower assembly of FIG. 1.

FIG. 1 schematically illustrates the major parts of a prior art reel mower assembly comprising a mower reel 2 rotatably mounted to a frame 4. A drive, not shown, is operative to rotate the reel 2 about a reel axis RA. A bed bar 6 forms a portion of the frame 4, and the bed knife 8 is attached to the bed bar 6 by screws 10. Typically some adjustment mechanism, not shown, is provided to vary the position of the bed bar 6 with respect to the reel 2 so that the proper cutting relationship between the bed knife 8 and reel 2 may be achieved. FIG. 2 illustrates schematically the orientation of the reel 2, the bed bar 6, and the bed knife 8 of the prior art.

Figure 3:
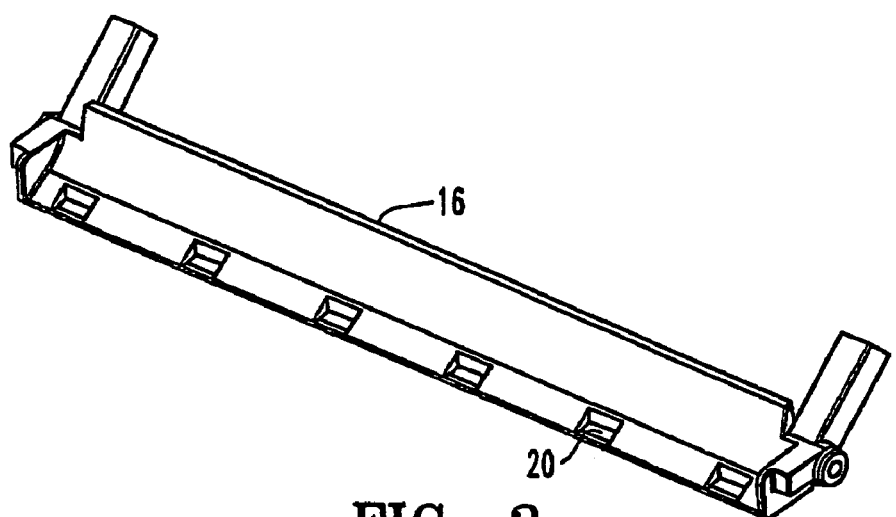
FIG. 3 is a perspective view of the top of a magnetic bed bar of one embodiment of the present invention.
Figure 4:
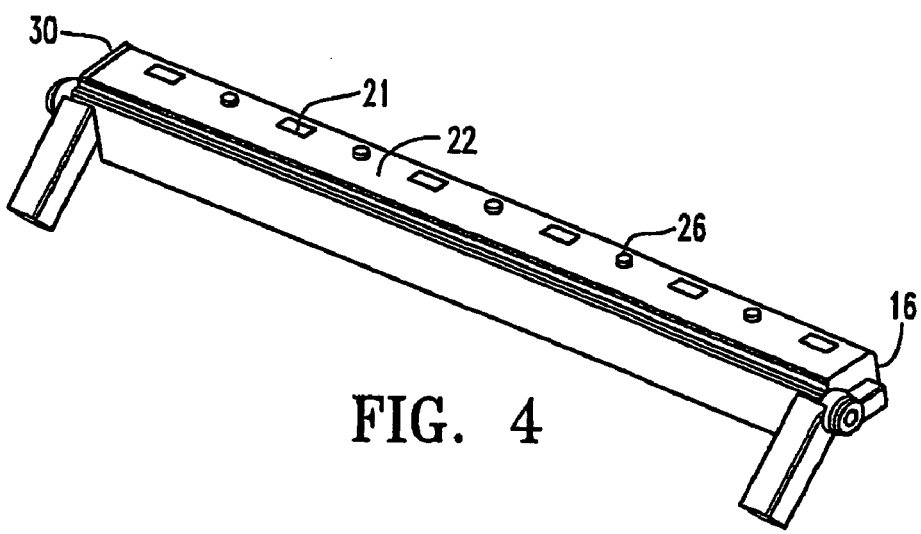
FIG. 4 is a perspective view of the bottom of the bed bar of FIG. 3.

FIGS. 3 and 4 illustrate an embodiment of a magnetic bed bar 16 of the invention. The illustrated bed bar 16 is configured to attach to the frame 4 of the prior art reel mower assembly of FIG. 1 in the same manner as the prior art bed bar 6, so that the magnetic bed bar 16 can be retro-fit to existing reel mower assemblies. The bed bar frame portion configuration is fairly widespread in various brands of existing reel mower assemblies, allowing for relatively simple modification of the magnetic bed bar such that same may be substituted for the existing bed bars.

As illustrated in FIGS. 3 and 4, a plurality of magnets 20 are mounted in a spaced apart relationship on the bed bar 16, and in the illustrated embodiment the magnets 20 are embedded in the bed bar 16 such that a lower face 21 thereof is substantially flush with the bottom surface 22 of the magnetic bed bar 16.

Figure 5:
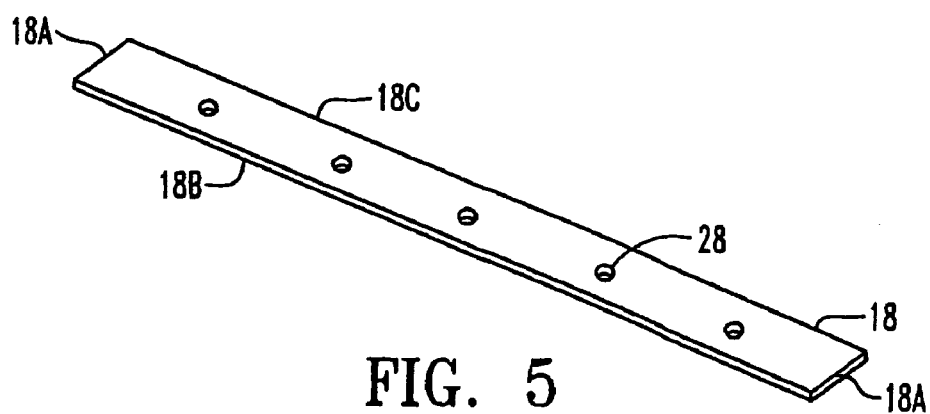
FIG. 5 is a perspective view of a bed knife for attachment to the magnetic bed bar of FIG. 3.
Figure 6:
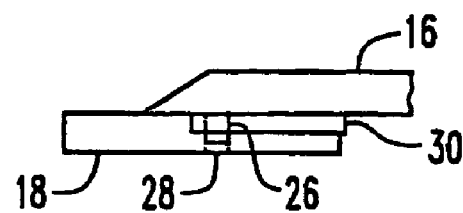
FIG. 6 is a schematic side view of the bed knife of FIG. 5 in the operating position on the magnetic bed bar of FIG. 3.

The bed knife 18, illustrated in FIG. 5, is magnetically held against the magnets 20 in an operating position as illustrated in FIG. 6 such that the bed knife 18 is oriented in cutting relationship with the reel 2 in the same fashion as the bed knife 8 of the prior art illustrated in FIG. 2.

Figure 7:
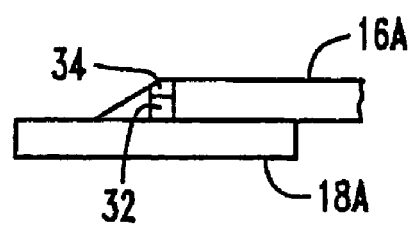
FIG. 7 is a schematic side view of an alternate bed knife and magnetic bed bar.

Engagement means are operative to prevent sliding movement of the bed knife 18 with respect to the magnets 20. In the illustrated embodiment the engagement means comprises a plurality of protrusions, illustrated as pegs 26, extending from the bed bar 16 into a corresponding recess, illustrated as a hole 28, in the bed knife 18. Conversely as illustrated in FIG. 7, the pegs 32 could extend up from the bed knife 18A into corresponding holes 34 in the bed bar 16A. Further engagement means are illustrated in FIG. 6 as a ridge 30 bearing against opposite end edges 18A and rear edge 18B of the bed knife 18.

While preventing sliding movement, the engagement means, illustrated as pegs 26 in holes 28, and as ridge 30, but also including other means, also allows the bed knife 18 to move away from the magnets 20 when a separating force is exerted on the bed knife 18 in a direction away from the magnets 20 that is greater than an attractive force exerted on the bed knife 18 by the magnets 20 when the bed knife 18 is in the operating position. While allowing the bed knife 18 to be easily removed by prying it away from the bed bar 16, this configuration also allows the bed knife to release from the bed bar 16 when an obstruction is encountered.

Figure 8:
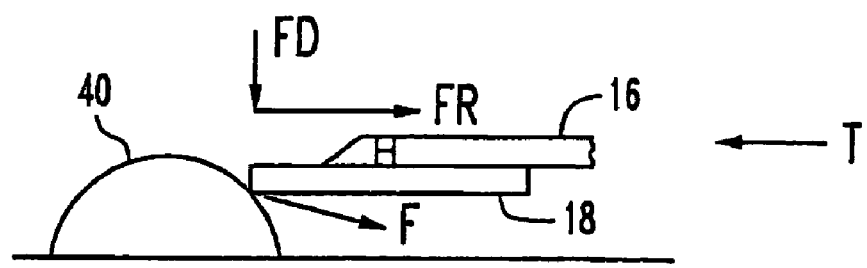
FIG. 8 is a side view of the bed bar of FIG. 7 contacting an obstruction and indicating the forces exerted on the bed knife to release it from the bed bar.

FIG. 8 illustrates schematically contact of the bed knife 18 moving in direction T with a typical obstruction ill as a partially buried stone 40. The contact causes a force F to be exerted on the bed knife 18. The major component of this force F is exerted rearward, as illustrated by the arrow FR, however there is also a smaller component FD exerted downward such that the bed knife 18 is pushed away from the bed bar 16 and the magnets 20. When this component of force FD exceeds the magnetic attractive force of the magnets 20 the bed knife 18 will release from the bed bar 16. In the prior art bed knife attached by screws, more damage would occur, since the bed knife would have to ride over the obstruction. Similarly where a stone or the like comes between the reel and the bed knife, a like force is exerted which can release the bed knife, reducing the possibility of severe damage to the reel which can be costly to repair.

The ridge 30 alone could provide satisfactory operation with a new bed knife 18, as same essentially forms a low pocket that closely fits the edges 18A, 18B of the bed knife 18. Sideways and rearward sliding movement with respect to the magnets 20 is thus prevented. It is however possible to make the bed knife 18 double edged such that the front and rear edges 18C, 18B are both cutting edges. The holes 28 and pegs 26 are oriented such that the bed knife 18 can be rotated bringing the rear cutting edge 18B to the front, thereby doubling the life of the bed knife 18. With such a double edged bed knife 18, the front edge becomes worn and rounded during use such that the ridge bears against a rounded edge that may slide over the ridge when rearward forces are applied. The pegs and holes are not affected by wear on the bed knife edges and will maintain the bed knife in position when it is rotated. The use of the ridge 30 in combination with the pegs 26 and holes 28 helps to align the bed knife with the pegs during installation.

The present invention could be practiced in a number of fashions including by manufacturing new reel cutting assemblies in accordance with the present invention, or alternatively, by producing a retrofit bed bar or support frame kit which would allow the magnetic blade attachment of the present invention to be implemented on an existing mower.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reel mower assembly comprising:
a reel rotatably mounted to a frame, said reel having a plurality of cutting blades;
a plurality of spaced apart magnets affixed said frame; and
a bed knife attached to said frame solely by said plurality of magnets in a cutting relationship with said reel, an engagement device associating said bed knife with said frame for maintaining a cutting a position and such that during use said bed knife detaches from said frame in a generally vertical direction when a force is exerted on said bed knife in a generally horizontal direction that is greater than an attractive force of said plurality of magnets.

2. The reel mower assembly of claim 1, further comprising:
said engagement device operative to prevent sliding movement of said bed knife relative to said frame.

3. The reel mower assembly of claim 1, said engagement device further comprising:
a protrusion to prevent sliding movement of said bed knife with respect to said frame, said protrusion extending from said frame into a corresponding recess of said bed knife.

4. The reel mower assembly of claim 1, further comprising:
at least one ridge attached to said frame and bearing against an edge of said bed knife.

5. The reel mower assembly of claim 4, further comprising:
a ridge bearing against each opposite end edge of said bed knife, and a ridge bearing against a rear edge of said bed knife.

6. The reel mower assembly of claim 1 wherein said frame further comprises:
a bed bar oriented substantially parallel to an axis of said reel, said first magnet being affixed to said bed bar.

7. A reel mower assembly comprising:
a frame;
a reel rotatably mounted to said frame and comprising a plurality of cutting blades;
a bed knife; and
a plurality of spaced apart magnets across said frame securing said bed knife to said frame in an operable position such that said bed knife is oriented in a generally cutting relationship with said reel, an engagement device associating said bed knife with said frame for maintaining a cutting position and such that during use said bed knife detaches from said frame in a generally vertical direction when said bed knife is exposed to generally horizontal forces, said bed knife being maintained in said operable position primarily by magnetic force of said plurality of magnets.

8. The reel mower assembly of claim 7, wherein:
said engagement device operative to prevent sliding movement of said bed knife relative to said frame.

9. The reel mower assembly of claim 8 wherein said engagement device comprises:
a protrusion extending from said frame into a corresponding recess of said bed knife.

10. The reel mower assembly of claim 8 wherein said engagement device comprises:
at least one ridge attached to said frame and bearing against an edge of said bed knife.

11. The reel mower assembly of claim 8 wherein said engagement comprises:
a ridge bearing against each opposite end edge of said bed knife, and a ridge bearing against a rear edge of said bed knife.

12. The reel mower assembly of claim 7 wherein said frame further comprises:
a bed bar oriented substantially parallel to an axis of said reel, said magnet being affixed to said bed bar.

13. An apparatus adapted for attachment to a reel mower assembly comprising a mower reel rotatably mounted to a frame, said apparatus comprising:
a bed bar adapted for attachment to said frame substantially parallel to a reel axis;
a plurality of spaced magnets mounted on said bed bar; and
a bed knife solely magnetically carried by said bed bar in cutting relationship with said reel, an engagement device associating said bed knife with said frame for maintaining a cutting position and such that during use said bed knife detaches from said bed bar in a generally vertical direction when a force exerted on said bed knife in a generally horizontal direction is greater than the attracting force of said plurality of magnets.

14. The apparatus of claim 13, wherein:
said engagement device preventing sliding movement of said bed knife relative to said frame, said engagement device extending from said frame into a corresponding recess of said bed knife.

15. The apparatus of claim 14 wherein said engagement device further comprises:
    at least one protrusion extending from said frame into a corresponding recess in said bed knife.

16. The apparatus of claim 14 wherein said engagement device further comprises:
    at least one ridge attached to said frame and bearing against an edge or said bed knife.

17. The apparatus of claim 16 wherein said engagement device further comprises;
    a ridge bearing against each opposite end edge of said bed knife, and a ridge bearing against a rear edge of said bed knife.

18. In a reel mower assembly comprising a mower reel rotatably mounted to a frame, and a drive operative to rotate said reel about a reel axis, a method of holding a bed knife in an operating position such that said bed knife is oriented in cutting relationship with said reel, said method comprising:
    providing a plurality of spaced-apart magnets on at least one of said frame and said bed knife; and
    affixing said bed knife to said frame primarily by magnetic attraction of said plurality of magnets in said operating position such that said bed knife is oriented in cutting relationship with said reel when said bed bar is attached to said frame;
    associating an engagement device with said bed knife and said frame for maintaining a cutting position and such that, in use, said bed knife is detached from said frame in a generally vertical direction when a force is exerted on said bed knife in a generally horizontal direction to separate said bed knife in a direction away from said frame.

19. The method of claim 18, further comprising:
    preventing sliding movement of said bed knife with respect to said magnet.

20. The method of claim 19 wherein said preventing sliding movement further comprises:
    providing at least one protrusion extending from said frame into a corresponding recess in said bed knife.

* * * * *

UNITED STATES PATENT AND TRADEMARK OFFICE
CERTIFICATE OF CORRECTION

PATENT NO.        : 7,434,380 B2                                             Page 1 of 1
APPLICATION NO.   : 11/095715
DATED             : October 14, 2008
INVENTOR(S)       : Jeff Buchko et al.

It is certified that error appears in the above-identified patent and that said Letters Patent is hereby corrected as shown below:

Column 4, line 66, "illustrates schematically" should be --schematically illustrates--

Column 4, line 67, "ill" should be --such--

Column 5, line 53, claim 1, delete "a"

Column 6, line 41, claim 11, insert --device-- after "engagement"

Signed and Sealed this

Sixth Day of January, 2009

JON W. DUDAS
*Director of the United States Patent and Trademark Office*